United States Patent [19]

Coggon

[11] Patent Number: 4,465,178
[45] Date of Patent: Aug. 14, 1984

[54] COMPOSITE DRIVE OR CONVEYOR BELT

[75] Inventor: Robert F. Coggon, London, England

[73] Assignee: Molins Limited, London, England

[21] Appl. No.: 41,554

[22] Filed: May 23, 1979

[30] Foreign Application Priority Data

May 24, 1978 [GB] United Kingdom ............... 21995/78

[51] Int. Cl.³ .................................................. B65G 15/42
[52] U.S. Cl. ..................................... 198/688; 198/847
[58] Field of Search ............... 198/688, 698, 699, 847, 198/846, 844, 834; 156/137

[56] References Cited

U.S. PATENT DOCUMENTS

| | | | |
|---|---|---|---|
| 2,423,579 | 7/1947 | Buren | 198/844 |
| 2,628,706 | 2/1953 | Guba | 198/834 |
| 2,732,867 | 1/1956 | May et al. | 198/688 |
| 3,100,565 | 8/1963 | Fry | 198/847 |

Primary Examiner—Joseph E. Valenza
Attorney, Agent, or Firm—Antonelli, Terry & Wands

[57] ABSTRACT

Conveyor belt for cigarettes or other delicate articles which has flights which extend across its width and are formed with rounded ends so as not to present any sharp edges to damage the articles. The belt is formed from three thicknesses of polyester web, i.e. a middle layer which is flat, and two outer layers, one of which is impressed with rounded shapes forming the flights and the other of which is impressed with angular shapes forming drive teeth. The forming may be carried out by pressing each layer between suitable heated rollers. The layer having the conveyor flights is preferably so formed that the flights do not extend to the extreme edges but leave a narrow edge margin which can be continuously bonded to the assembly comprising the other two layers. Two layer belts may also be constructed on the same principle, for example by omitting the inner flat layer in the case of a conveyor and drive belt, or by omitting one of the layers in the case of a belt for conveying or driving only, and reinforcing wires may be incorporated between the two layers.

3 Claims, 4 Drawing Figures

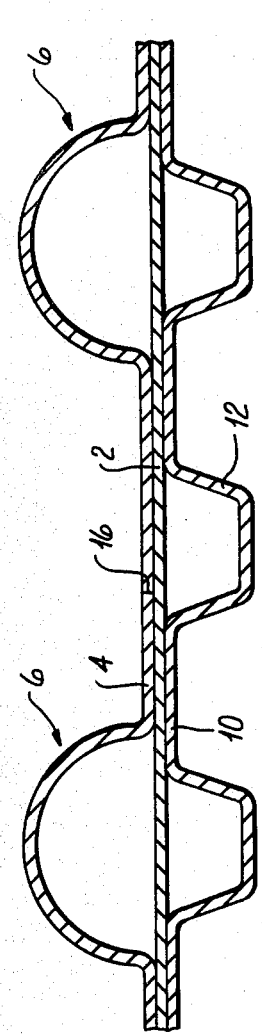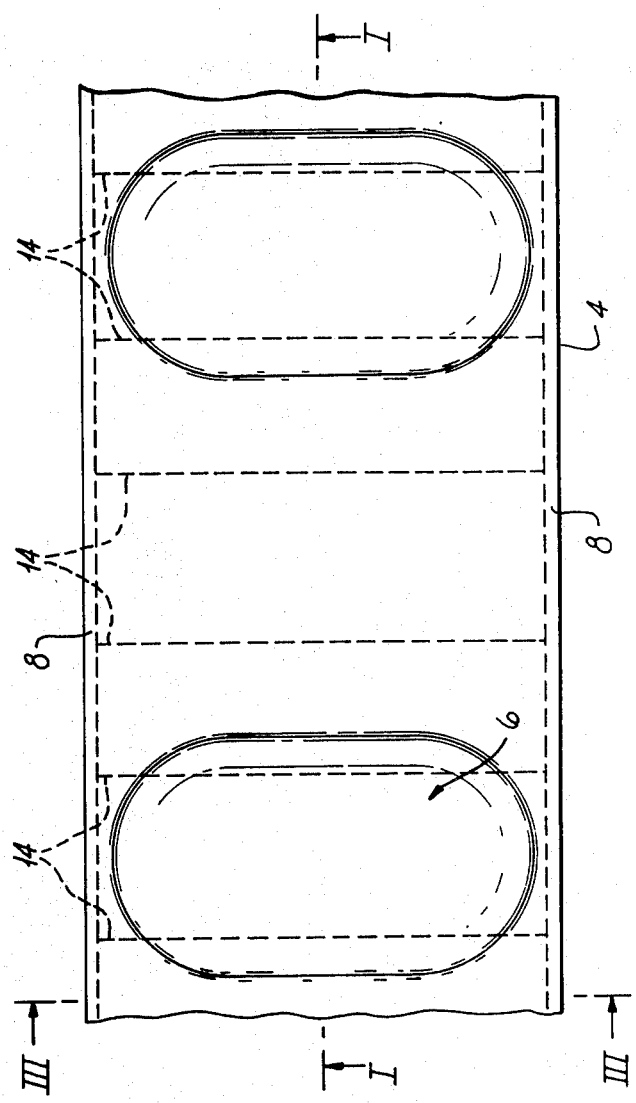

COMPOSITE DRIVE OR CONVEYOR BELT

This invention relates to drive and conveyor belts, and particularly to composite belts made from or including layers of flexible materials such as synthetic plastics.

According to one aspect of the present invention there is provided a conveyor or drive belt comprising a first layer of flexible material forming a substrate, and a second layer of flexible material which is deformed in such a way as to provide either projections adapted to engage articles to be conveyed, or projections adapted to engage drive teeth, which second layer is bonded to one surface of the first layer at intervals.

The invention also extends to a toothed conveyor belt for conveying delicate articles, comprising a first layer of flexible material forming a substrate, a second layer of flexible material which is deformed in such a way as to provide rounded projections adapted to engage articles to be conveyed, and bonded to one surface of the first layer and a third layer of flexible material which is deformed in such a way as to form projections adapted to engage drive teeth, and which is bonded to the other surface of the first layer. The term "rounded" is intended to convey that all the outermost portions of the projections are rounded, so that there are no sharp edges in positions where they might come into contact with the articles to be conveyed. Thus in the case of elongate projections extending across the width of the belt, the projections are not "cut-off" abruptly near the edges of the belt but are sloped down towards the edges in a rounded contour.

The different layers may be formed from one continuous length of material which has different regions left plain or impressed with the projection as appropriate, and is then wound around itself in a spiral form i.e. convoluted so that the different regions each form one "layer."

Preferably, when separate lengths of web are used they are "staggered" relative to one another around the belt so that their ends do not coincide. This enables the ends of each web to be "joined" very simply by bonding them directly onto the surface of the adjacent web, which is continuous at that point.

Thus according to a further aspect of the invention there is provided a composite drive or conveyor belt comprising at least two layers of flexible material, at least one of the layers being deformed to provide a series of projections, the layers comprising lengths of web which are staggered relative to one another so that the ends of one web do not coincide with those of the other, and the ends of each web being joined by bonding them to an adjacent web.

Preferably the material of the webs is one which is capable of being ultrasonically welded, such as polyester. This makes the bonding operation very simple since the bonding tools can be positioned on either side of a "sandwich" of two pieces of the material, to form a bond between them. The polyester can be obtained in a "pretensiled" form which is particularly suitable for the substrate of a belt.

The projections of the belt are preferably formed by deforming the material of the respective webs before they are assembled, for example by passing them between forming rollers, or by pressing out the projections between a pair of shaped reciprocating forms. Alternatively the projections may be vacuum formed.

Projections suitable to engage drive teeth, i.e. having a "trapezium" cross-section which is uniform across the width of the web, may conveniently be formed by passing the web between a pair of cooperating heated rollers, but in some cases it may be desired to form projections which are not uniform across the width of the belt, for example when the projections are intended to engage with delicate articles to be conveyed. The reason for this is that the ends of the projections, at the edges of the belt, can be quite sharp and so might damage the articles. According to a further aspect of the invention, therefore there is provided a conveyor belt for delicate articles comprising at least two layers of flexible material, one of which is provided with a series of rounded projections formed by distorting the material of the web for example by the application of mechanical or fluid pressure and/or heat.

In the case of a belt having projections such as those of the immediately preceding paragraph, the projections preferably do not extend to the extreme edges of the belt, but instead a narrow margin of undistorted material is left along the whole length of the edge of the web. This enables the layer having the projections to be very simply and quickly attached to the substrate layer by forming a continuous band all along their co-extensive edges, in a known fashion e.g. thermally or ultrasonically. In the case of a belt having drive teeth intended to engage positively with drive elements, on the other hand, it is preferred to bond the layers between successive teeth so as to obtain adequate strength.

Thus in accordance with a further aspect of the invention there is provided a composite conveyor belt, comprising a first layer of flexible material forming a substrate, a second layer of flexible material which is deformed in such a way as to provide projections adapted to engage articles to be conveyed, which projections extend across the central part of the second layer but not to the extreme edges, the second layer being bonded to one surface of the first layer along their co-extensive edges, and a third layer of flexible material which is deformed in such a way as to form projections adapted to engage drive teeth, and which is bonded to the other surface of the first layer between the projections. Preferably the third layer is slightly narrower than the other two.

In the case of a belt comprising three layers such as that of the immediately preceding paragraph, the stiffness of the assembly will depend upon the "phase relationship" between the pitches of the projections of the two other layers, and of course on the relative sizes and frequencies of the projections, and thus belts having different degrees of flexibility can be produced by varying these factors.

In one form of the invention, the two or three layers are made from one continuous length of material. In the case of a belt having teeth on one side and flights for conveying articles on the other, such a belt may be produced by forming a predetermined number of drive teeth along a first length of the material i.e. approximately one third of the total length starting from one end, leaving the next (one-third) length of material plain, and forming a predetermined number of flights for conveying articles along the remaining (one-third) length of the material, and then connecting the three sections together in a "spiral form." Preferably the layers are bonded together starting from the inside of the spiral, to facilitate the application of the bonding tools. At the ends the adjacent surface may be embossed to avoid the formation of a "step" in the surface.

In order to strengthen the composite structure, the belt may also incorporate continuous reinforcing members such as stranded wire or fibreglass cord. Such reinforcement may be incorporated by a method of construction which includes the steps of positioning a first layer of flexible belt material around an endless former, e.g. a drum-shaped member, winding the reinforcing member(s) around the first layer, and then bonding a further layer of flexible belt material onto the first layer and the reinforcement. According to a further aspect of the invention, a composite drive or conveyor belt is formed by positioning a first layer of thermoplastic flexible belt material around a former, winding a substantially inextensible reinforcing member or members of heat-conductive material around the first layer, positioning a second layer of thermoplastic flexible belt material around the reinforcing material, and causing the reinforcing member(s) to become heated so that the two layers of flexible belt material are caused to melt locally at their interface and thus weld the assembly together. The reinforcement may for example be in the form of metallic wire or fibreglass cord loaded with carbon or graphite which can be heated by R.F. induction.

One embodiment of the invention will now be described by way of example with reference to the accompanying drawings, in which:

FIG. 1 is a vertical cross-section through a composite belt taken along the line I—I of FIG. 2;

FIG. 2 is a plan view of the belt of FIG. 1;

The belt shown is intended particularly for use in the "mass-flow elevator" section of a cigarette conveying system, and is about 5 cm wide. It comprises three layers of polyester each about 0.014" (0.35 mm) in thickness. The central layer 2 is plain, while the upper layer 4 is formed with projections 6 which take the form of elongate "bubbles" extending across the width of the web almost as far as the edges, but leaving a narrow margin 8 along each edge, which in this example is 2–3 mm wide. These projections may for example be formed by pressing the web between a pair of cooperating shaped formers which are heated to set the web to the desired shape.

Figure 3:
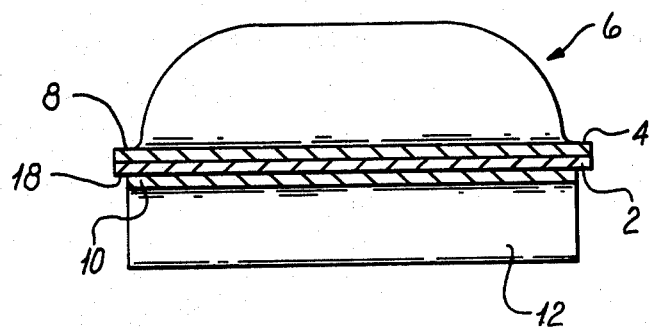
FIG. 3 is a cross-section along the line III—III of FIG. 2.
Figure 4:
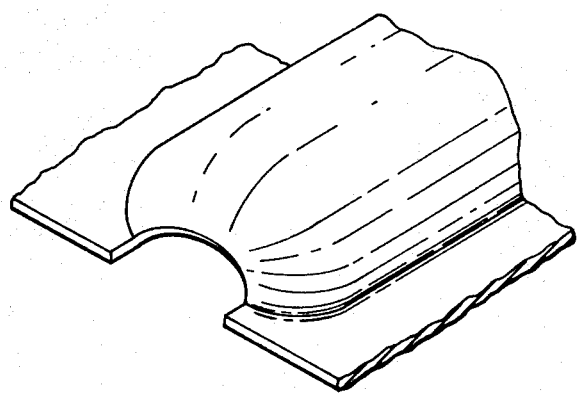
FIG. 4 is a partial perspective view of a modified form of belt.

Although the projections 6 are shown as having completely spherical closed ends, it will be appreciated that the extreme ends may be of various shapes and in particular may be left open, particularly if it is desired to increase the flexibility of the finished belt, so long as the ends of the upper surface of each projection are curved downwardly towards the belt so as to avoid leaving any sharp edges in positions where they might damage the articles to be conveyed. One example of such an alternative end shape is shown in FIG. 4.

The lower layer 10 is narrower than the other two by about 4–6 mm and is formed with a series of drive-engaging teeth 12 which can be produced simply by corrugating the web between a pair of suitably-shaped rolls, which may also be heated, although it is also possible to set the polyester material to a desired shape while cold, using suitable forming tools.

Alternatively the teeth may be formed, either hot or cold, using a single or multi-toothed reciprocating tool.

Another method of producing projections (of whatever shape) is to apply high frequency electrical heating only to the areas to be deformed, using suitable shaped probes or electrodes on each side of the layer; or the H.F. heating may be applied to the whole layer immediately before forming in a conventional manner, to soften. Such heating may also be used for bonding the layers together.

In assembling the belt shown, the "toothed" layer 10 is first bonded to the substrate layer 2, by applying an ultrasonic bonding tool to the opposite sides of the two layers at each side of each tooth, e.g. along the lines 14 of FIG. 2. A margin 18 of 2–3 mm is left along each edge of the layer 2 (the web 10 being 4–6 mm narrower), and thus allows the upper layer 4 to be subsequently bonded onto the assembly by its edges, by simply running a suitable bonding tool continuously along the margin 8.

By arranging the respective ends of the three webs in different positions around the assembly, the problem of jointing the ends is considerably reduced, because they can simply be bonded to the adjacent web. For example, in the case of layer 4 the ends may be positioned as indicated at 16, and each end can be separately bonded to the underlying layer 2.

The belt may also be constructed so as to incorporate substantially inextensible reinforcement such as stranded wire. Such an arrangement is particularly suitable for a belt comprising two layers of thermoplastic material such as polyester, in which case the reinforcement is sandwiched between the layers. To produce a belt of this kind having drive teeth on one side and flights for conveying articles on the other side, a first length of polyester having drive teeth (for example) is first wrapped around a drum-shaped former with the teeth facing inwards and its ends are temporarily secured together. A number of turns of reinforcement, e.g. stranded wire or fibreglass cord, is then wrapped around the exposed surface of the first layer of the belt, and a second layer of polyester having conveyor flights (for example) is wrapped around the reinforcement and again its ends are temporarily secured together. The reinforcement is then heated by passing an electric current through it. This may be achieved by means of an R.F. induction coil, or simply by leading the two ends of the reinforcement wire out of the sandwich and connecting them across a suitable voltage source. Sufficient heat is applied in this way, to melt the thermoplastic material around the wire and thus bond the whole assembly together.

I claim:

1. A conveyor belt for conveying delicate rodlike articles in a direction transverse to their lengths, comprising at least two layers of flexible material which are bonded together, and one of which has a series of integrally-formed rounded projections defining parallel-sided recesses for receiving and conveying a plurality of said articles to be conveyed, said projections being elongated transversely of said belt and extending parallel to the articles to be conveyed and having rounded ends so that the projections have no edges which might damage said articles, said layers of flexible material comprising a first plain layer of flexible material; a second layer of flexible material which is deformed in such a way as to form further projections adapted to engage drive teeth, which second layer is bonded to one surface of the first layer, and a third layer of flexible material which is deformed in such a way as to form said rounded projections to engage articles to be conveyed, which third layer is bonded to the other surface of the first layer.

2. A conveyor belt according to claim 1 in which the layers are formed from a single continuous length of material having projections formed along part or parts of its length, the material then being convoluted to form the layers.

3. A conveyor belt according to claim 1 in which the layers comprise separate webs of material which are staggered relative to one another around the belt so that their ends do not coincide, the ends of each web being fastened in position by bonding them to the surface of an adjacent web.

* * * * *